United States Patent
Ribback

[15] 3,668,915
[45] June 13, 1972

[54] MACHINE TOOL FOR PLASTIC SHAPING OR FASHIONING

[72] Inventor: Bernd Ribback, Rue de Mertert 48, Wasserbillig, Luxembourg

[22] Filed: April 28, 1969

[21] Appl. No.: 819,912

[52] U.S. Cl. .................................................72/76, 72/402
[51] Int. Cl. ...........................................................B21j 7/10
[58] Field of Search ...............................................72/76, 402

[56] References Cited

UNITED STATES PATENTS 3,263,478  8/1966  Brauer et al. ..........................72/402

Primary Examiner—Lowell A. Larson
Attorney—Holman & Stern

[57] ABSTRACT

A machine tool for plastic shaping or fashioning by hammering, forging, pressing, etc. in which the shaping is accomplished by means of rocking levers having arms of different lengths, with the tools for effecting the working strokes being carried by the shorter arms and being driven by the longer arms.

3 Claims, 2 Drawing Figures

INVENTOR
BERND RIBBACK

INVENTOR
BERND RIBBACK

MACHINE TOOL FOR PLASTIC SHAPING OR FASHIONING

BACKGROUND OF THE INVENTION

The invention relates to a machine tool for plastic fashioning or shaping.

For plastic fashioning or shaping, it is necessary to feed, particularly extended or elongated work pieces such as rods, pipes, tubes etc., in a rotatable manner to the machine tool. Such rotatable feeding assemblages usually include an axially displaceable support mounted in a machine bed and in which there is arranged a rotatable hollow spindle provided with a chuck. The workpieces are introduced from the rear into the hollow spindle, clamped, turned, advanced, retracted, unclamped and removed. Such rotatable feeding assemblages are extremely complex and must be connected to the molding machine per se. Moreover, the rotatable introduction process frequently consumes more time than the plastic fashioning or shaping proper. In pipes or conduits whose weight will permit a manual feed, a higher output is realized with a manual feed than with a mechanical feed. In addition, there also bars whose length and flexibility do not permit rotation and whose walls are so thin that such workpieces can no longer be clamped.

It is also known to feed the work material by means of parabolic helical rollers but this type of feed is rather limited in view of the fact there is only linear contact between the workpiece and the driving rollers.

In all of the known feeding assemblages, it not possible to feed by mechanical means, stirrup like or U-shaped pipes whose ends are to be reduced.

SUMMARY OF THE INVENTION

The salient object of the present invention is to provide a machine tool for plastic shaping or fashioning which is so designed that at the same time it assumes the function of the heretofore series connected complex feeding assembly with its characteristic feature being that the rocking levers with two arms are mounted with their tool holders for rotation about a shaping or fashioning axis.

Further objects and advantages of the invention will become more readily apparent to persons skilled in the art from the following detailed description and annexed drawings in which:

DETAILED DESCRIPTION OF THE INVENTION

Figure 1:
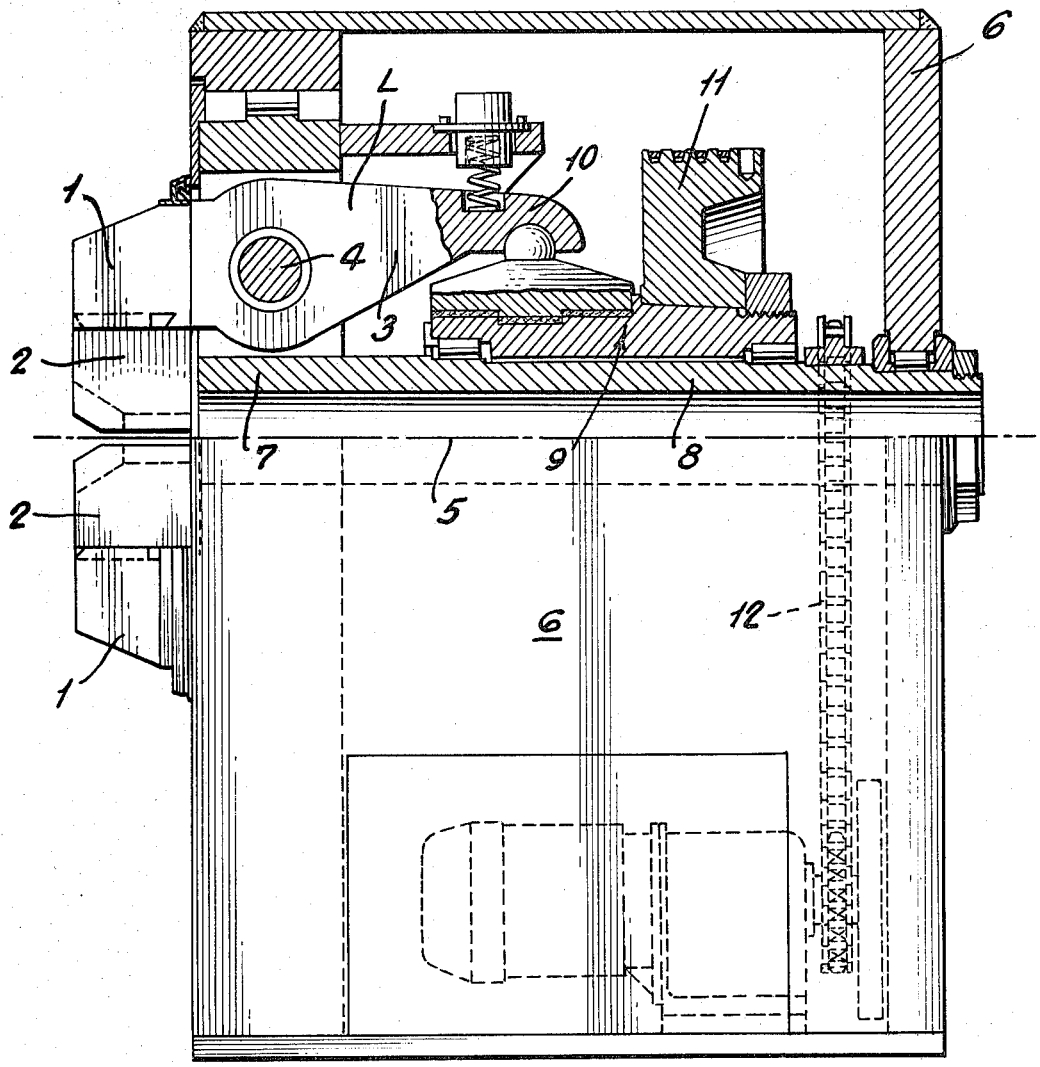
FIG. 1 is a view partly in longitudinal section and partly in elevation of a machine tool embodying the invention.
Figure 2:
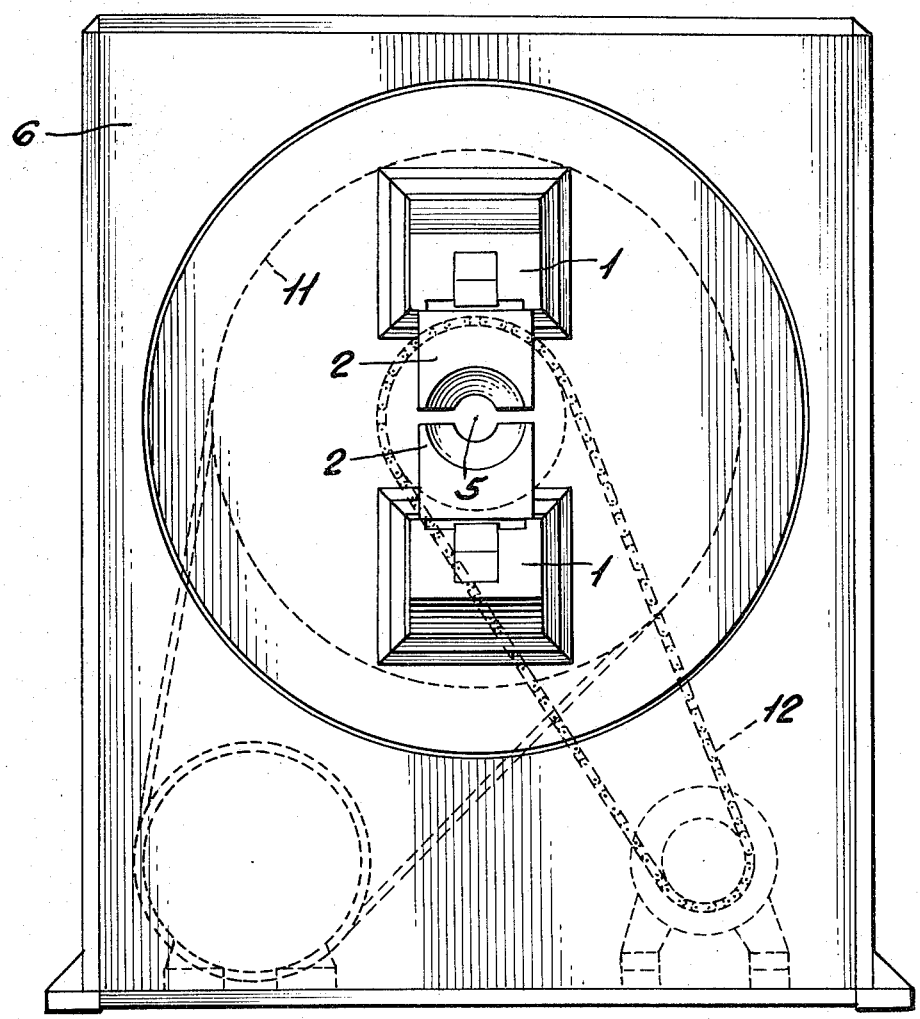
FIG. 2 is a front elevational view of the machine tool illustrated in FIG. 1.

Referring to the drawings, there is illustrated a machine casing or housing 6 within which levers L are mounted and through which the plastic shaping or fashioning is effected by hammering, forging, pressing, etc. More particularly, each lever is adapted to swing about a pivot 4 and includes a short arm 1 and a long arm 3. Each short arm 1 carries a tool and tool holder 2 and each lever receives its drive via the long arm 3 for swinging movement about the pivot 4 so that the tools may execute their working strokes. It will be noted that the levers L and the tool holders are mounted for rotation about a working or fashioning axis 5.

As clearly disclosed in FIG. 1, the ends of the short arms 1 project outwardly of the casing 6 so that the tool holders and tools are readily accessible exteriorly of the casing 6. This particular arrangement of the tool holders and tools is particularly efficacious for plastic shaping in that the tool holders and tools are freely accessible from three sides.

It is advantageous that the levers L be arranged in a longitudinal direction parallel to the axis 5 and that the levers be pivotably mounted on one end 7 of a hollow shaft 8 rotatably mounted in the casing 6. The shaft 8 functions to entrain the pivots 4 and as a consequence the levers L during the rotary movement about the axis 5.

A drive for effecting the working strokes of the levers L with their tools rotates freely on the hollow shaft 8. As illustrated in the drawings, a driven eccentric bushing 9 rotates freely on the shaft 8 and is provided with a force locking connection with ends 10 of the long arms 3 of the levers for providing the working strokes. The rotation of the bushing 9 on the shaft 8 is accomplished by means of a motor driven pulley and rope or belt assemblage denoted generally as 11. The drive for the levers L about the shaft 8 for setting the shaping axis in rotation is effected by a motor-driven rope or chain type transmission indicated generally as 12. This arrangement means that the drives 11 and 12 are separated from each other for rotation of the levers L about the axis 5 as well as for the development of the working strokes.

The machine tool is not impaired by the fact that the drives 11 and 12 are coupled with each other for mutual engagement and disengagement and the coupling of the drives 11 and 12 can be so designed that the tools can operate with any number of strokes and independently thereof can rotate the shaft 8 and thus the levers L about the axis 5. It is also within the scope of the invention to provide a coupling between the drives 11 and 12 which is so constructed that the rotary movements of the levers L and their tools are effected in dependence upon their stroke movements since rotation takes place only, for example, if the shaping tools move apart.

I claim:

1. In a machine tool for plastic shaping by hammering, forging, pressing and the like, comprising a casing, a hollow rotatable shaft mounted in said casing and defining a working axis, and a plurality of cooperating pivotable levers each having a short arm carrying a working tool and a long arm on opposite sides of its pivot point, the improvement wherein said hollow rotatable shaft is rotatably mounted at its opposite ends in said casing by respective bearing means defining a pair of axially spaced radial planes, each of said levers being pivotably mounted to said rotatable shaft adjacent one end thereof by pivotal means located in one of said radial planes, for rotation about said working axis with said rotatable shaft.

2. The improvement of claim 1, further comprising an eccentric bushing mounted on said rotatable shaft intermediate the ends thereof for rotation relative to said shaft, said eccentric bushing being coupled force-locked with the free ends of the respective long arms of said pivotable members to effect the working strokes of the levers, and means for effecting rotation of said eccentric bushing relative to said shaft to thereby effect the working stroke of said pivotable levers.

3. The improvement of claim 2, wherein said short arms of the pivotable levers extend outwardly of the casing, the working tools being located outside of the casing.

* * * * *